US009245478B2

(12) United States Patent
Kitazawa

(10) Patent No.: US 9,245,478 B2
(45) Date of Patent: Jan. 26, 2016

(54) DISPLAY DEVICE HAVING A VOLTAGE LIMITING CIRCUIT TO ENSURE THAT THE VOLTAGE BETWEEN THE DRAIN AND SOURCE OF A PIXEL'S DRIVING TRANSISTOR DOES NOT EXCEED A PREDETERMINED VALUE

(75) Inventor: Takayuki Kitazawa, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 657 days.

(21) Appl. No.: 13/548,872

(22) Filed: Jul. 13, 2012

(65) Prior Publication Data

US 2013/0027373 A1    Jan. 31, 2013

(30) Foreign Application Priority Data

Jul. 26, 2011    (JP) ................................ 2011-163316

(51) Int. Cl.
    *G09G 3/32*     (2006.01)
    *H04N 13/04*    (2006.01)

(52) U.S. Cl.
    CPC ........ *G09G 3/3233* (2013.01); *G09G 2300/043* (2013.01); *G09G 2310/0281* (2013.01); *G09G 2330/04* (2013.01); *H04N 13/0429* (2013.01)

(58) Field of Classification Search
    CPC ............. G09G 3/32–3/3291; G09G 2300/043; G09G 2300/088; G09G 2330/04; G09G 2320/043–2320/048
    See application file for complete search history.

(56) References Cited

U.S. PATENT DOCUMENTS

| 6,529,178 | B1 | 3/2003 | Kimura |
| 2001/0019319 | A1* | 9/2001 | Kim ................................. 345/77 |
| 2001/0045929 | A1* | 11/2001 | Prache et al. ................... 345/89 |
| 2002/0084463 | A1* | 7/2002 | Sanford et al. .................. 257/82 |
| 2006/0007071 | A1 | 1/2006 | Yamazaki et al. |
| 2006/0245121 | A1 | 11/2006 | Numao |
| 2007/0242002 | A1* | 10/2007 | Kawabe .......................... 345/76 |
| 2008/0170011 | A1 | 7/2008 | Kohno et al. |
| 2009/0206764 | A1* | 8/2009 | Schemmann et al. ..... 315/241 R |
| 2011/0069061 | A1* | 3/2011 | Nakamura ..................... 345/214 |

FOREIGN PATENT DOCUMENTS

| JP | 2004-517363 A | 6/2004 |
| JP | A-2005-062794 | 3/2005 |
| JP | A-2006-023586 | 1/2006 |
| JP | A-2008-170788 | 7/2008 |
| JP | A-2008-181005 | 8/2008 |
| JP | 2008-292866 A | 12/2008 |
| JP | A-2009-152113 | 7/2009 |
| JP | A-2009-537852 | 10/2009 |
| WO | 02/054373 A2 | 7/2002 |

* cited by examiner

*Primary Examiner* — Chanh Nguyen
*Assistant Examiner* — Navin Lingaraju
(74) *Attorney, Agent, or Firm* — Oliff PLC

(57) ABSTRACT

A pixel circuit 110 includes a driving transistor, a light-emitting element, and a voltage limiter circuit. The transistor and the light-emitting element are connected in series between power supply. The transistor allows an electric current that is dependent on a voltage between its gate and source to flow through the light-emitting element. The light-emitting element emits light at a luminance that is dependent on an electric current that flows between two terminals. The voltage limiter circuit performs voltage limiting in such a way as to ensure that a voltage between the drain of the transistor and the source thereof does not exceed a predetermined value.

11 Claims, 11 Drawing Sheets

DISPLAY DEVICE HAVING A VOLTAGE LIMITING CIRCUIT TO ENSURE THAT THE VOLTAGE BETWEEN THE DRAIN AND SOURCE OF A PIXEL'S DRIVING TRANSISTOR DOES NOT EXCEED A PREDETERMINED VALUE

BACKGROUND

1. Technical Field

The present invention relates to an electro-optical device that can prevent a transistor from being damaged, a power supply method that is to be used by the electro-optical device, and an electronic apparatus.

2. Related Art

Recently, various kinds of electro-optical devices in which light-emitting elements such as organic light-emitting diode (hereinafter referred to as "OLED") elements are built have been proposed in the art. Such an electro-optical device typically has the following structure. A plurality of scanning lines and a plurality of data lines are formed over a glass substrate. A pixel circuit is provided at a position corresponding to each of the intersections of the scanning lines and the data lines. The pixel circuit includes, in addition to the light-emitting element, a driving transistor that allows an electric current to flow through the light-emitting element. Therefore, the driving transistor is formed as a thin film transistor.

Such an electro-optical device is required to be small in size and offer high definition. To meet strict requirements for a small size and high definition, a technique of forming pixel circuits not over a glass substrate but over a silicon substrate has been proposed in the art. An example of such a technique is disclosed in JP-A-2009-152113.

In a structure in which pixel circuits are formed over a silicon substrate, though it is easier to reduce the size of each transistor, the withstand voltage of the transistor is lower. Therefore, depending on an electric current that flows through the light-emitting element, there is a risk that a voltage that is higher than the withstand voltage might be applied to the driving transistor, resulting in the breakdown of the driving transistor.

SUMMARY

An advantage of some aspects of the invention is to provide an electro-optical device that can prevent a driving transistor that allows an electric current to flow through a light-emitting element from being damaged, a power supply method that is to be used by the electro-optical device, and an electronic apparatus.

An electro-optical device according to an aspect of the invention includes: a pixel circuit that includes a driving transistor; a light-emitting element; a voltage limiter circuit; wherein the driving transistor and the light-emitting element are connected in series between power supply, the driving transistor allows an electric current that is dependent on a voltage between a gate of the driving transistor and a source of the driving transistor to flow through the light-emitting element, the light-emitting element emits light at a luminance that is dependent on an electric current that flows between the source of the driving transistor and a drain of the driving transistor, and the voltage limiter circuit performs voltage limiting in such a way as to ensure that a voltage between the drain of the driving transistor and the source of the driving transistor does not exceed a predetermined value.

An electro-optical device according to an aspect of the invention includes: a pixel circuit that includes a driving transistor; a light-emitting element; a voltage limiter circuit; wherein the driving transistor and the light-emitting element are connected in series between voltage-variable power supply, the driving transistor allows an electric current that is dependent on a voltage between a gate of the driving transistor and a source of the driving transistor to flow through the light-emitting element, the light-emitting element emits light at a luminance that is dependent on an electric current that flows between the source of the driving transistor and a drain of the driving transistor, and the voltage limiter circuit performs voltage limiting in such a way as to ensure that a voltage between the drain of the driving transistor and the source of the driving transistor does not exceed a predetermined value. With such a configuration, it is possible to prevent a driving transistor that allows an electric current to flow through a light-emitting element from being damaged.

It is preferred that the voltage limiter circuit should be a diode; one terminal of the diode should be connected to a point of junction of the driving transistor and the light-emitting element; and the other terminal of the diode should be connected to a feeder line for a predetermined voltage level. In the above configuration, it is preferred that the diode should be a diode-connected transistor or a diode element. With such a configuration, a transistor or a diode element will suffice as the diode added in each pixel circuit.

In the above configuration, a potential that is equal to the sum of a voltage that is based on a level of a voltage that is applied to one of two terminals of the light-emitting element, a threshold voltage of the light-emitting element, and a threshold voltage of the diode may be applied to the feeder line; and the one terminal may be a point that is not connected to the driving transistor. With such a configuration, even when a power voltage is changed, it is possible to perform voltage limiting in such a way as to ensure that a voltage between the drain of the driving transistor and the source of the driving transistor does not exceed a predetermined value while keeping track of the change.

It is preferred that the pixel circuit should be provided at a position corresponding to each of intersections of a plurality of scanning lines and a plurality of data lines; the plurality of scanning lines, the plurality of data lines, and the plurality of pixel circuits should be formed on the same single substrate; and a potential of the data line should be retained at the gate of the driving transistor when the scanning line is selected. In the above configuration, it is preferred that a first element for acquiring the threshold voltage of the light-emitting element and a second element for acquiring the threshold voltage of the diode should be formed on the substrate. In such a configuration, the first element and the second element are formed on the same substrate together with the light-emitting element and the diode.

It is preferred that the light-emitting element should include a pixel electrode and a common electrode; the pixel electrode should be connected via the driving transistor to a power line to which a fixed potential is applied; and a potential of the common electrode should be set variably, thereby configuring the power supply as voltage-variable power supply.

Besides an electro-optical device, the invention can be embodied and/or implemented as a power supply method that is to be used by the electro-optical device and an electronic apparatus that is provided with the electro-optical device. A typical example of the electronic apparatus is a display device such as a head mount display and an electronic viewfinder.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, an exemplary embodiment of the present invention will now be explained.

Figure 1:
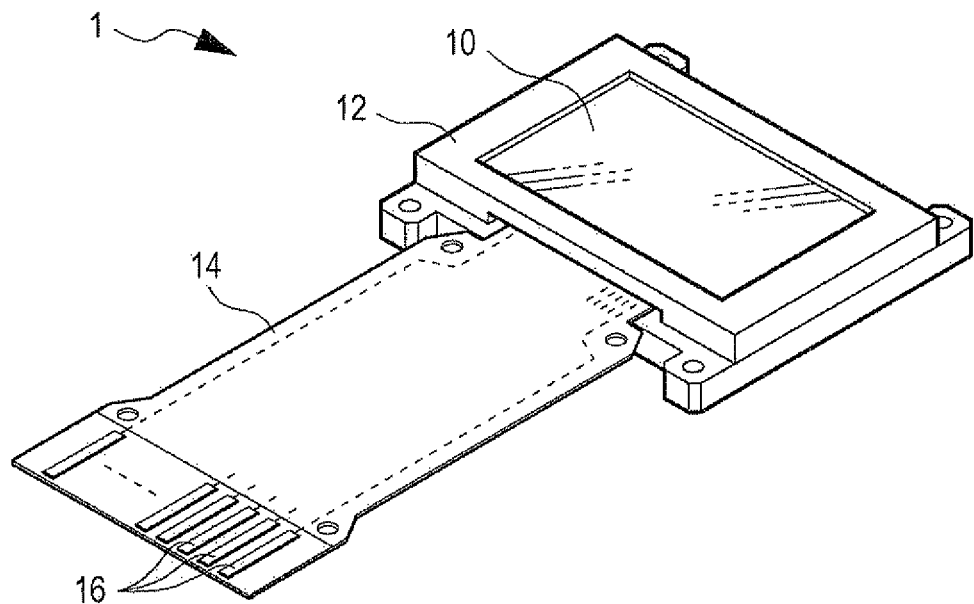
FIG. 1 is a perspective view that illustrates an electro-optical device according to an exemplary embodiment of the invention.

FIG. 1 is a perspective view that illustrates an electro-optical device 1 according to an exemplary embodiment of the invention.

The electro-optical device 1 illustrated in this drawing is used for, for example, a head mount display (HMD). The electro-optical device 1 includes a micro display 10 that displays an image. As will be described later, the micro display 10 is an organic EL device that includes a silicon substrate on which a plurality of pixel circuits, a peripheral circuitry for driving the plurality of pixel circuits, and the like are formed. The pixel circuit includes an OLED.

The micro display 10 is encased in a case 12 that has an opening formed at an area where the pixel circuits are arranged. One end of an FPC (Flexible Printed Circuit) wiring board 14 is connected to the micro display 10. A plurality of terminals 16 is formed at the other end of the FPC wiring board 14. A circuit module that is not illustrated therein is connected to this end. The circuit module, which is connected to the terminals 16, functions also as the power-supply and control circuit of the micro display 10. The circuit module applies a voltage of various levels to the micro display 10 and supplies a data signal, a control signal, and the like thereto through the FPC wiring board 14.

Figure 2:
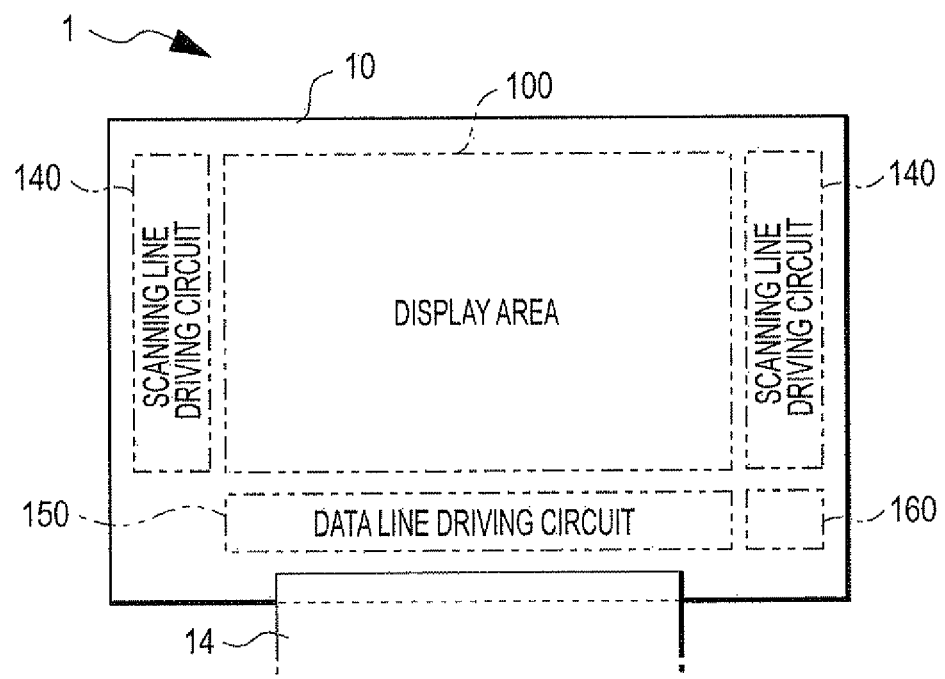
FIG. 2 is a plan view that illustrates an example of the arrangement of components in the electro-optical device.
Figure 3:
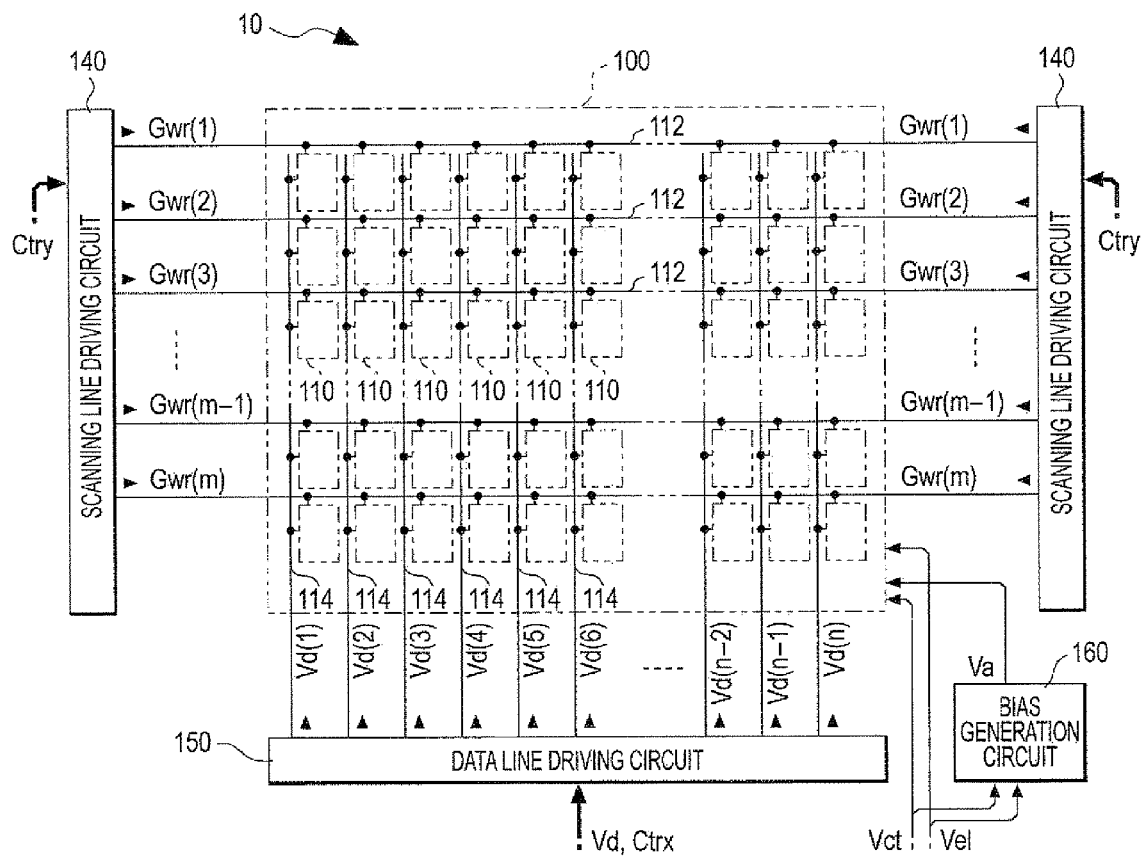
FIG. 3 is a diagram that illustrates an example of the electric configuration of the electro-optical device.

FIG. 2 is a plan view that illustrates an example of the component arrangement of the micro display 10. FIG. 3 is a pixel block diagram that illustrates an example of the electric configuration of the micro display 10. For the purpose of explanation, in FIG. 2, the arrangement of components is shown in a case-removed state, that is, after the removal of the case 12 illustrated in FIG. 1.

When viewed in plan, a display unit (display area) 100 has a diagonal size of, for example, one inch or smaller and has a rectangular shape that is in landscape orientation as illustrated in FIG. 2. Specifically, as illustrated in FIG. 3, plural scanning lines 112, the number of which is denoted as m, and plural data lines 114, the number of which is denoted as n, are formed in the display area 100. Each of the m scanning lines 112 extends in the horizontal direction. Each of the n data lines 114 extends in the vertical direction. The m rows of the scanning lines 112 and the n columns of the data lines 114 are electrically insulated from each other. A pixel circuit 110 is provided at a position corresponding to each of the intersections of the m rows of the scanning lines 112 and the n columns of the data lines 114. Therefore, these pixel circuits 110 are arranged in a matrix pattern.

The value m is a natural number. The value n is also a natural number. For the purpose of individual identification of the scanning lines 112 and the rows of the pixel circuits 110 in the matrix, each of them may be hereinafter referred to with the corresponding one of ordinal numbers assigned sequentially from the top of FIG. 3. That is, in the following description, these rows may be referred to as the 1st, 2nd, 3rd, ..., (m−1)th, and m-th rows. In like manner, for the purpose of individual identification of the data lines 114 and the columns of the pixel circuits 110 in the matrix, each of them may be hereinafter referred to with the corresponding one of ordinal numbers assigned sequentially from the left of FIG. 3. That is, in the following description, these columns may be referred to as the 1st, 2nd, 3rd, ..., (n−1)th, and n-th columns.

Two scanning line driving circuits 140 are provided next to the display unit 100. As illustrated in FIG. 2, one of the two scanning line driving circuits 140 is provided to the left of the display unit 100. The other is provided to the right thereof. As illustrated in FIG. 3, more specifically, these two scanning line driving circuits 140 are configured to drive each of the m rows of the scanning lines 112 from the respective sides.

The same control signal Ctry is supplied from the circuit module mentioned above to the two scanning line driving circuits 140. The two scanning line driving circuits 140 supply the same scanning signals Gwr(1), Gwr(2), Gwr(3), ..., Gwr(m−1), and Gwr(m) to the 1st, 2nd, 3rd, ..., (m−1)th, and m-th scanning lines 112, respectively.

If a signal delay does not matter when these scanning signals are supplied, a single scanning line driving circuit 140 may be provided at one side only.

As illustrated in FIG. 2, a data line driving circuit 150 is provided between the display area 100 and an area where the FPC wiring board 14 is connected. As illustrated in FIG. 3, a video signal Vd and a control signal Ctrx are supplied from the circuit module mentioned above to the data line driving circuit 150. Controlled by means of the control signal Ctrx, the data line driving circuit 150 outputs the video signal Vd in the form of data signals Vd(1), Vd(2), Vd(3), ..., Vd(n−1), and Vd(n) onto the 1st, 2nd, 3rd, ..., (n−1)th, and n-th data lines 114, respectively.

A bias generation circuit 160 is provided at an area outside the display area 100 on the micro display 10. For example, the bias generation circuit 160 is provided at the lower right corner as illustrated in FIG. 2. The bias generation circuit 160 generates, besides power for logical signals described later, a bias voltage Va from voltages Vel, Vct, and the like as illustrated in FIG. 3. A more detailed explanation of this bias potential will be given later. The voltages Vel and Vct are supplied from the circuit module mentioned above through the FPC wiring board 14. The voltages Vel and Vct are supplied together with the bias voltage Va, which is generated by the bias generation circuit 160, to the display unit 100.

Figure 4:
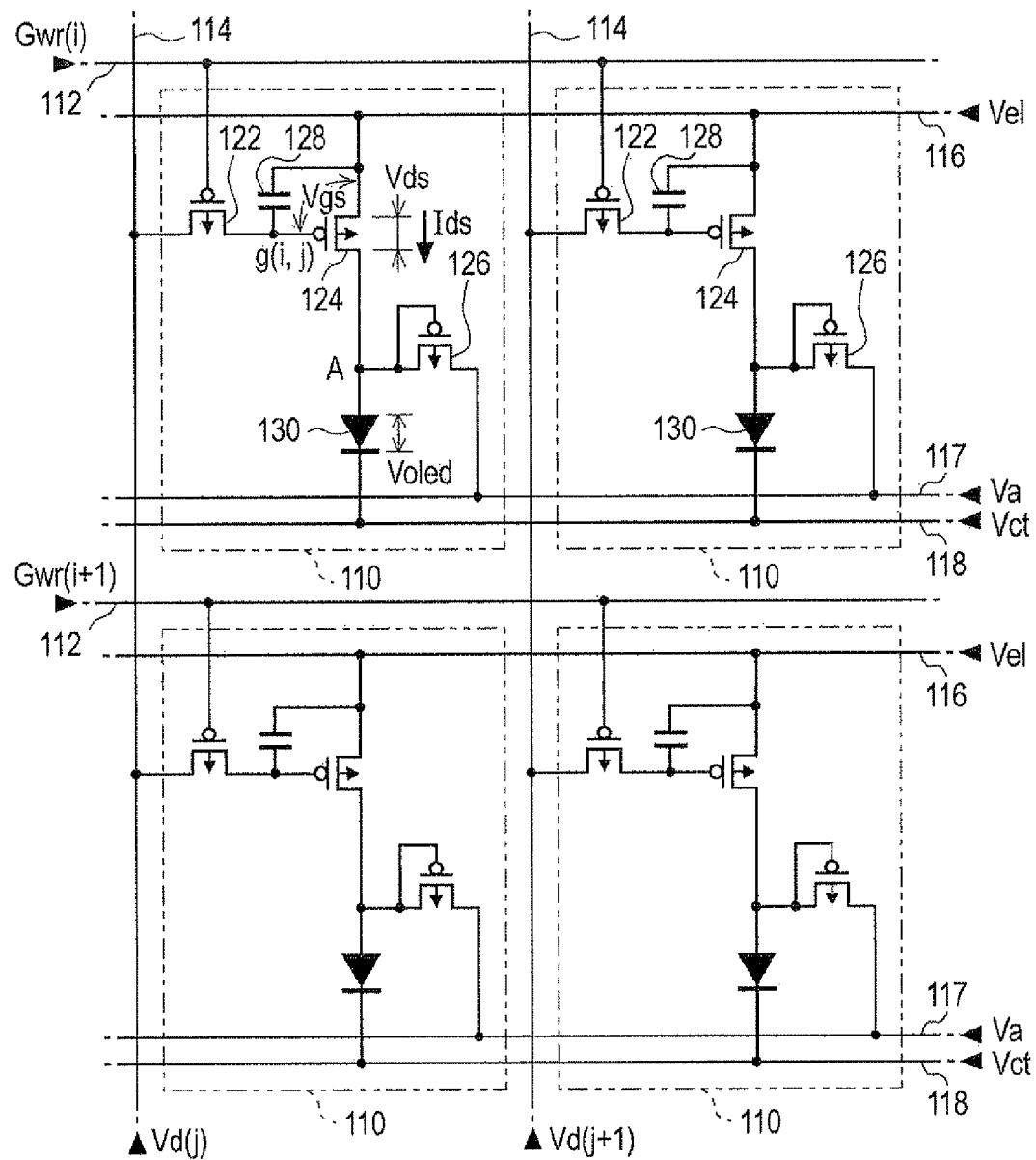
FIG. 4 is a diagram that illustrates an example of pixel circuits in the electro-optical device.

FIG. 4 is a circuit diagram of the pixel circuits 110. In this drawing, the pixel circuits 110 for four pixels (2×2 pixels) corresponding to the intersections of the i-th and (i+1)-th scanning lines 112, that is, those on the i-th and (i+1)-th rows, and the j-th and (j+1)-th data lines 114, that is, those on the j-th and (j+1)-th columns, are illustrated. The (i+1)-th scanning line 112 is one that is located adjacent to and below the i-th scanning line 112. The (j+1)-th data line 114 is one that is located adjacent to and to the right of the j-th data line 114. The symbol i, (i+1) denotes the ordinal number of a row of the pixel circuits 110, where it is an integer that is not less than one and not greater than m. In like manner, the symbol j, (j+1) denotes the ordinal number of a column of the pixel circuits 110, where it is an integer that is not less than one and not greater than n.

As illustrated in FIG. 4, each of the plurality of pixel circuits 110 includes p-channel MOS (Metal Oxide Semiconductor) transistors 122, 124, and 126, a capacitor 128, and an OLED 130. The OLED 130 is a light-emitting element. Since the configuration of each of the pixel circuits 110 is the same as that of the others, the configuration of the pixel circuit 110 that is on the i-th row and the j-th column only will now be explained. In the pixel circuit 110 on the i-th row and the j-th column, the gate node of the transistor 122, which functions as a switching transistor, is connected to the i-th scanning line 112. The drain node of the transistor 122 is connected to the j-th data line 114. The source node of the transistor 122 is connected to one terminal of the capacitor 128 and the gate node of the transistor 124.

The other terminal of the capacitor 128 is connected to the source node of the transistor 124 and a feeder line 116. The voltage Vel, the level of which corresponds to the power-high side of the pixel circuit 110, is supplied thereto through the feeder line 116. The drain node of the transistor 124 is connected to the anode of the OLED 130, the gate node of the transistor 126, and the drain node of the transistor 126.

The anode of the OLED 130 is a pixel electrode that is provided individually for each of the plurality of pixel circuits 110. The cathode of the OLED 130 is a common electrode 118 that is provided throughout the entire region of the pixel circuits 110. The voltage Vct, the level of which corresponds to the power-low side, is supplied to the cathode of the OLED 130. The OLED 130 is an element in which a light-emitting layer is sandwiched between the anode and the cathode, which are opposite to each other. The light-emitting layer is made of an organic EL material. The OLED 130 emits light at a luminance level that is dependent on the amount of an electric current that flows from the anode to the cathode.

The source node of the transistor 126 of a voltage limiter circuit is connected to a feeder line 117. More specifically, the transistors 126 of a row of the pixel circuits 110 are connected in common to the feeder line 117 to share the feeder line 117. The bias potential Va, which is an example of a predetermined voltage level, is applied through the feeder line 117. Since the gate node of the transistor 126 is connected to its drain node, it functions as a diode in which a direction from its source node to its drain node is a forward direction.

The pixel circuits 110, which are provided in the display area 100, are formed together with the scanning line driving circuit 140, the data line driving circuit 150, and the bias generation circuit 160 on a silicon substrate.

Each of the scanning signals Gwr(1) to Gwr(m), which are outputted from the scanning line driving circuit 140, is a logical signal that can selectively take two levels in a switched manner, that is, H and L. Therefore, the scanning line driving circuit 140 behaves as an aggregate of CMOS logical circuits. The power-high side of this circuitry is set at a voltage level Vdd. The power-low side of this circuitry is set at a voltage level Vss.

To make it easier to form the pixel circuits 110 in a small size and a small pitch, the transistors 122, 124, and 126 are configured as the same type of transistors, for example, p-channel transistors, and, in addition, their substrate voltage level is set to be, for example, the high-side level Vdd.

In FIG. 4, Gwr(i) and Gwr(i+1) denote scanning signals supplied to the i-th scanning line 112 and the (i+1)-th scanning line 112, respectively; Vd(j) and Vd(j+1) denote data signals supplied to the j-th data line 114 and the (j+1)-th data line 114, respectively.

For the purpose of explanation, the gate node of the transistor 124 in the pixel circuit 110 on the i-th row and the j-th column is denoted as g(i, j). The junction of the drain node of the transistor 124, the gate node of the transistor 126, the drain node of the transistor 126, and the anode of the OLED 130 is hereinafter referred to as node A.

Parasitic capacitance at the gate node of the transistor 124 may be used as a substitute for the capacitor 128, if possible.

Figure 5:
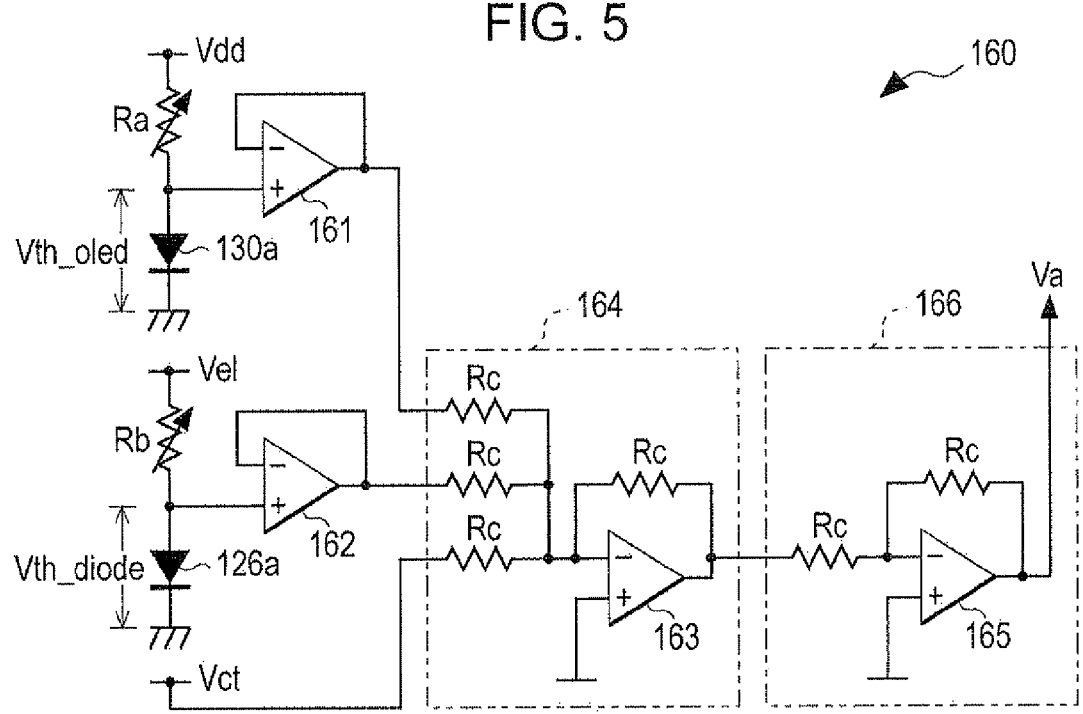
FIG. 5 is a diagram that illustrates an example of a bias voltage generation circuit in the electro-optical device.

FIG. 5 is a circuit diagram of the bias generation circuit 160.

In this drawing, an OLED 130a is an example of a first element that acquires the threshold voltage Vth_oled of the OLED 130. Therefore, for example, the cathode of the OLED 130a is grounded, whereas its anode is connected to a feeder line through which the power-high-side level Vdd is applied via a resistance element Ra. The resistance value of the resistance element Ra in the above connection configuration is adjusted in such a way as to set a voltage between the anode of the OLED 130a and the cathode thereof to be approximately equal to the threshold voltage Vth_oled of the OLED 130 while suppressing the level of an electric current that flows through the OLED 130a to be low. Therefore, a voltage outputted from a voltage follower operational amplifier 161 may be regarded as the threshold voltage Vth_oled.

The configuration of the OLED 130a is the same as that of the OLED 130. Unlike the OLED 130, however, the OLED 130a is provided outside the display area 100. The voltage of the OLED 130a is approximately equal to the threshold voltage Vth_oled, at which light emission starts. Therefore, the OLED 130a will never have an adverse effect on display at the display area 100.

In the present embodiment of the invention, the ground potential is set to be the low-side level Vss of the logical signal.

A diode 126a is an example of a second element that acquires the threshold voltage Vth_diode of the transistor 126, which is a diode-connected transistor. Therefore, for example, the cathode of the diode 126a is grounded, whereas its anode is connected to a feeder line through which the voltage Vel is applied via a resistance element Rb. The resistance value of the resistance element Rb in the above connection configuration is adjusted in such a way as to set a voltage between the anode of the diode 126a and the cathode thereof to be approximately equal to the threshold voltage Vth_diode of the transistor 126, which is a diode-connected transistor, while suppressing the level of an electric current that flows through the diode 126a to be low. Therefore, a voltage outputted from a voltage follower operational amplifier 162 may be regarded as the threshold voltage Vth_diode. A transistor that has the same size as that of the transistor 126 and is diode connected may be used as the diode 126a.

The threshold voltage Vth_oled, the threshold voltage Vth_diode, and a voltage corresponding to a difference between the ground potential and the voltage level Vct are supplied to an adding circuit 164, which includes an operational amplifier 163. The adding circuit 164 finds the sum of these input voltages and outputs the result of addition in an inverted form. An inverter circuit 166, which includes an operational amplifier 165, inverts the output of the adding circuit 164 again and outputs the result of re-inversion as the bias voltage Va. Therefore, when viewed while taking, as the basis of reference, the voltage level Vct, which is applied to one end of the OLED 130, more specifically, applied to a point that is not connected to the drain node of the transistor 124, the bias voltage Va according to the present embodiment of the invention is equal to the sum of the voltage corresponding to the difference between the ground potential and the voltage level Vct, the threshold voltage Vth_oled, and the threshold voltage Vth_diode. If the ground potential is taken as the basis of reference, the bias voltage Va according to the present embodiment of the invention is equal to the sum of the threshold voltage Vth_oled and the threshold voltage Vth_diode.

Figure 6:
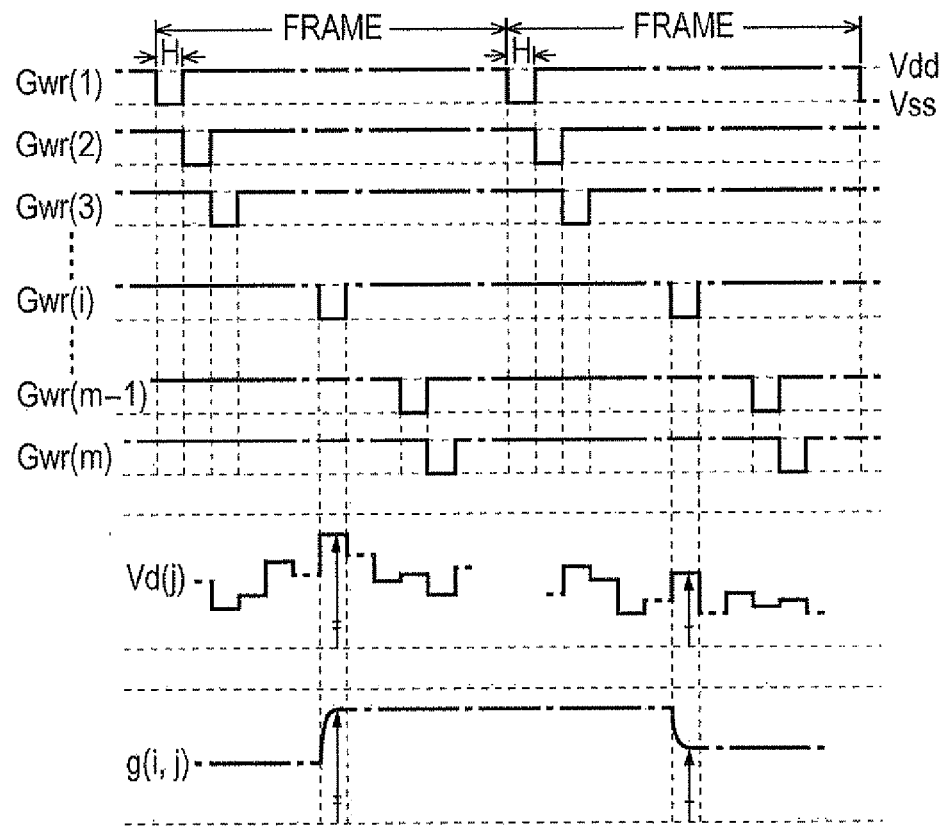
FIG. 6 is a diagram that illustrates an example of the operation of the electro-optical device.

FIG. 6 is a diagram that illustrates the display operation of the micro display 10. An example of the waveform patterns of scanning signals and a data signal is illustrated therein.

As illustrated in this drawing, the scanning signals Gwr(1), Gwr(2), Gwr(3), . . . , Gwr(m−1), and Gwr(m) are sequentially selected in each frame by the scanning line driving circuit 140. When selected, each of these scanning signals is exclusively in the L level throughout a horizontal scanning period (H), meaning that the others are in the H level in this period.

In the description of this specification, the term "frame" means a period of time taken for displaying video information for one cut (koma, which means a frame) of an image on the micro display 10. If a vertical scanning frequency is 60 Hz, a frame corresponds to 16.67 milliseconds, which is one cycle thereof. As described earlier, the power-high side of the scanning line driving circuit 140 is set at the voltage level Vdd. The power-low side of the scanning line driving circuit 140 is set at the voltage level Vss. Therefore, the H level of these scanning signals corresponds to the voltage level Vdd. The L level of these scanning signals corresponds to the voltage level Vss.

When the i-th scanning line 112 is selected, the level of the scanning signal Gwr(i) switches from H to L. In a state in which the scanning signal Gwr(i) is in the L level, the data signal Vd(j), the level of which is set in accordance with a target luminance value on the i-th row and the j-th column, is outputted onto the j-th data line 114 by the data line driving circuit 150.

In the pixel circuit 110 on the i-th row and the j-th column, the transistor 122 switches on when the level of the scanning signal Gwr(i) switches to L. Since the transistor 122 is on, the gate node g(i, j) is put into a state in which it is electrically connected to the j-th data line 114. For this reason, the voltage level of the gate node g(i, j) becomes equal to the level of the data signal Vd(j) as indicated by an up arrow in FIG. 6. When the voltage level of the gate node g(i, j) is in this level, the transistor 124 allows an electric current Ids, which is dependent on a difference between the voltage level of the gate node g(i, j) and the voltage level of the source node, that is, dependent on a voltage Vgs between the gate level and the source level, to flow through the OLEO 130. On the other hand, the capacitor 128 retains the voltage Vgs between the gate of the transistor 124 and the source thereof.

When the selected state of the i-th scanning line 112 ends, the level of the scanning signal Gwr(i) switches from L to H. In synchronization therewith, the transistor 122 switches from on to off. Even after the switching of the transistor 122 into off, the capacitor 128 retains the voltage level of the gate node g(i, j) of the transistor 124, which was there when the transistor 122 was on, as the between-gate-and-source voltage Vgs. Therefore, the transistor 124 continues to allow an electric current that is dependent on the voltage level retained by the capacitor 128 to flow through the OLED 130 till the next selection of the i-th scanning line 112. For this reason, in the pixel circuit 110 on the i-th row and the j-th column, the OLED 130 continues to emit light throughout a period of time corresponding to one frame at a luminance level that is dependent on the level of the data signal Vd(j) at the time of the selection of the i-th row.

On the i-th row, the OLEDs of the pixel circuits 110 other than the j-th one also emit light each at a luminance level that is dependent on the level of the data signal supplied through the corresponding data line 114. Though the pixel circuit(s) 110 corresponding to the i-th scanning line 112 is taken as an example in the above explanation, since the scanning lines 112 are selected sequentially in the order of the 1st, 2nd, 3rd, . . . , (m−1)th, and m-th rows, each row of the pixel circuits 110 perform light-emitting operation each (i.e., each of the pixel circuits in the row) at a target luminance level, that is, the target value specified by the row and the column. The operation described above is repeated cyclically, wherein one cycle corresponds to one frame.

Note that the potentials of FIG. 6 are not to scale; more specifically, for the purpose of explanation, the data signals Vd(j) and the gate node g(i, j) are scaled up potential-wise as compared with the potential scale of the scanning signals, which are logical signals.

Before explaining the advantages of the electro-optical device 1 according to the present embodiment of the invention, a comparative example of the embodiment will now be explained.

Figure 14:
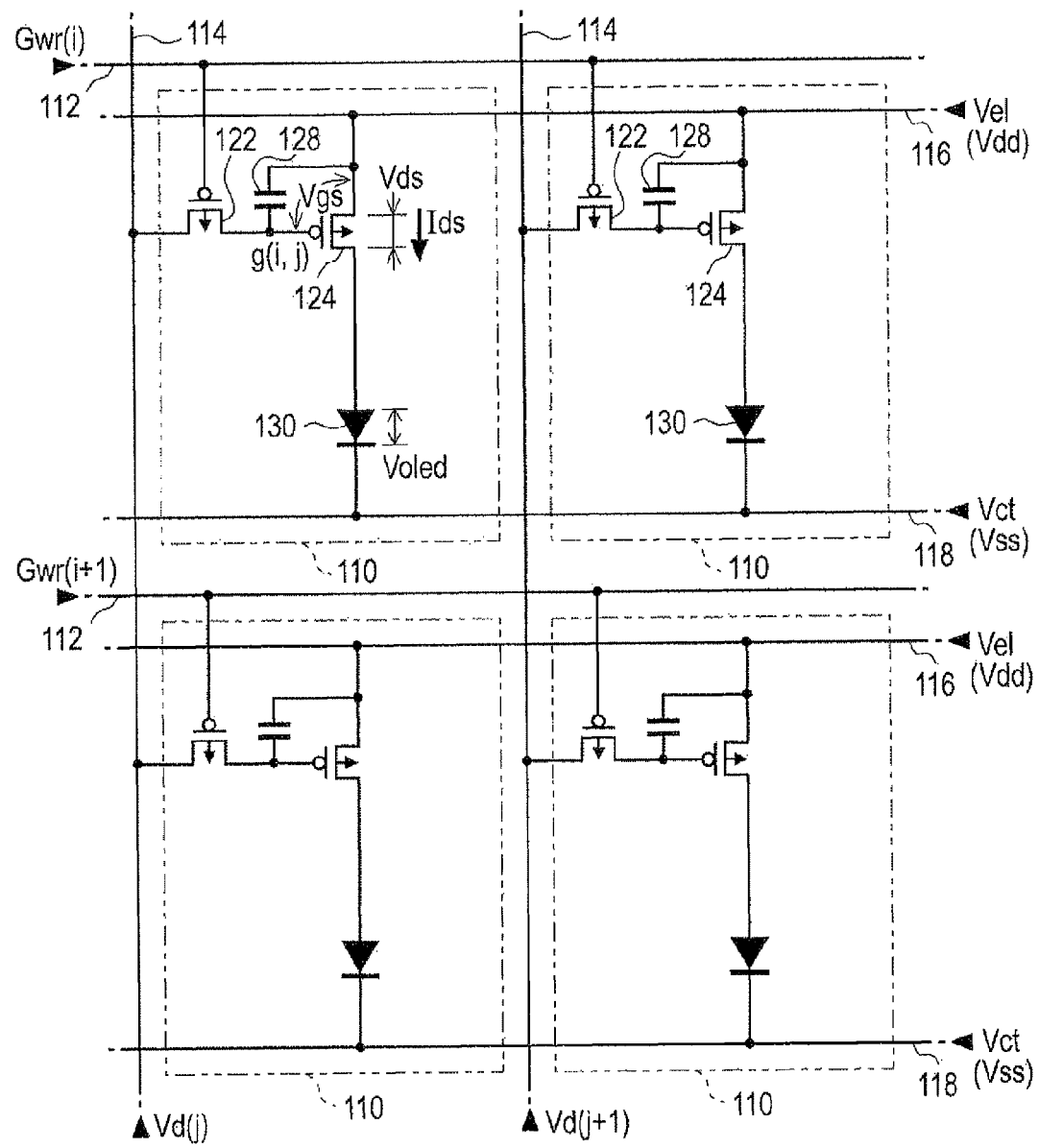
FIG. 14 is a diagram that illustrates the configuration of pixel circuits according to a comparative example.

FIG. 14 is a diagram that illustrates the configuration of pixel circuits according to a comparative example. The illustrated configuration does not include the transistor 126 and the feeder line 117, which are included in the configuration illustrated in FIG. 4.

When the micro display 10 is configured together with the pixel circuits 110 and peripheral circuits for driving the pixel circuits 110, the voltage levels Vdd and Vss are used for power supply for at least the scanning line driving circuit 140 of the peripheral circuits. Therefore, in the pixel circuits 110 according to the comparative example, as illustrated in FIG. 14, the power voltage levels Vel and Vct are set to be equal to the voltage levels Vdd and Vss, respectively.

Figure 15:
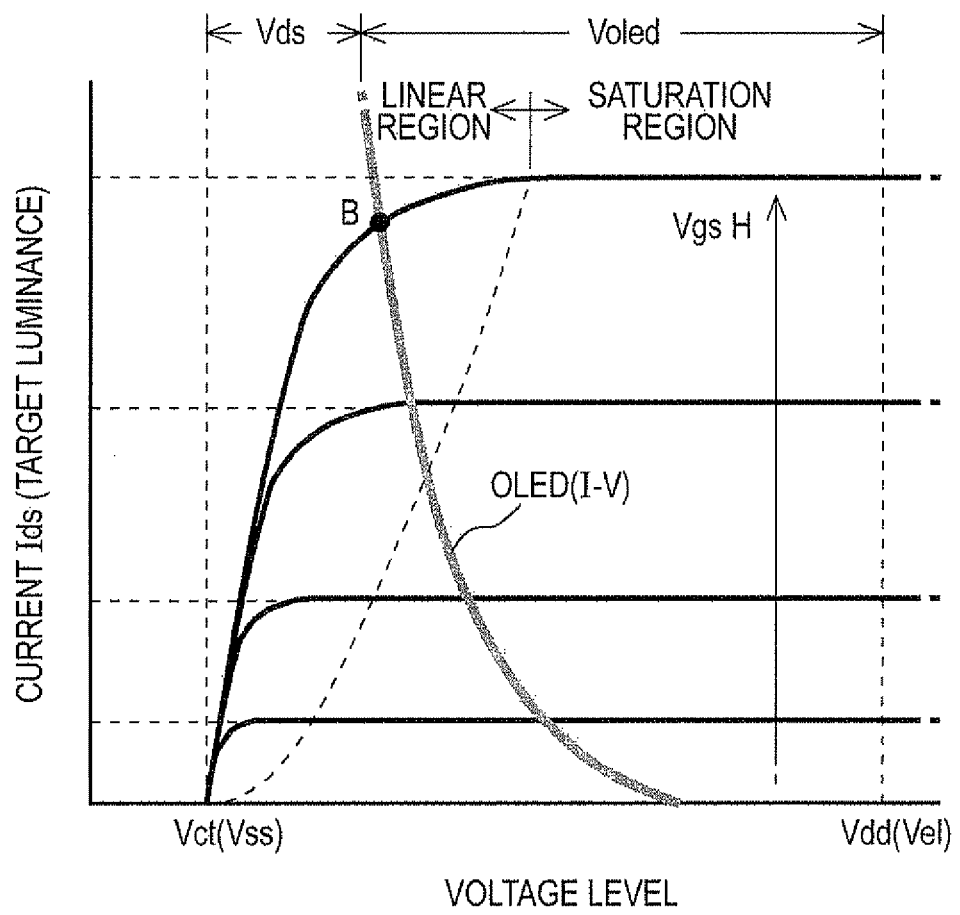
FIG. 15 is a diagram that illustrates the operating point of a driving transistor and an OLED according to a comparative example.

FIG. 15 is a diagram that illustrates the volt-ampere characteristics of the transistor 124 and the OLED 130 in the pixel-circuit configuration illustrated in FIG. 14. As illustrated in this drawing, as the voltage Vgs between the gate of the transistor 124 and the source thereof increases, so does the amount of the electric current Ids, which flows from the source thereof and the drain thereof. Since the transistor 124 is a p-channel transistor, the amount of the electric current Ids that flows increases as the voltage level of the gate node g(i, j) becomes lower as compared with the voltage level Vel (Vdd).

As the amount of the electric current Ids increases, the voltage Voted between the anode of the OLED 130 and the cathode thereof increases. The operating point of the transistor 124 and the OLED 130 for the electric current Ids is shown as the point of intersection of the two characteristic curves. It is the "between-gate-and-source" voltage Vgs of the transistor 124 that determines the electric current Ids. The voltage Vgs is equal to a difference between the voltage level Vel (Vdd) and the voltage level of a data signal. The voltage Vgs, which is determined by the voltage level of the data signal, behaves to determine the amount of the electric current Ids that flows through the OLED 130 in a saturation region. However, an operating point B for a case where the OLED 130 is caused to emit light at a high luminance level, that is, a case where the amount of an electric current that flows is large, is in the linear region of the transistor 124 because the voltage Voled between the anode of the OLED 130 and the cathode thereof is high. For this reason, it is impossible to supply, to the OLED 130, a sufficient amount of an electric current that is determined by the voltage Vgs at the high-luminance side. In other words, the luminance of the OLED 130 falls short of the target luminance.

Figure 7:
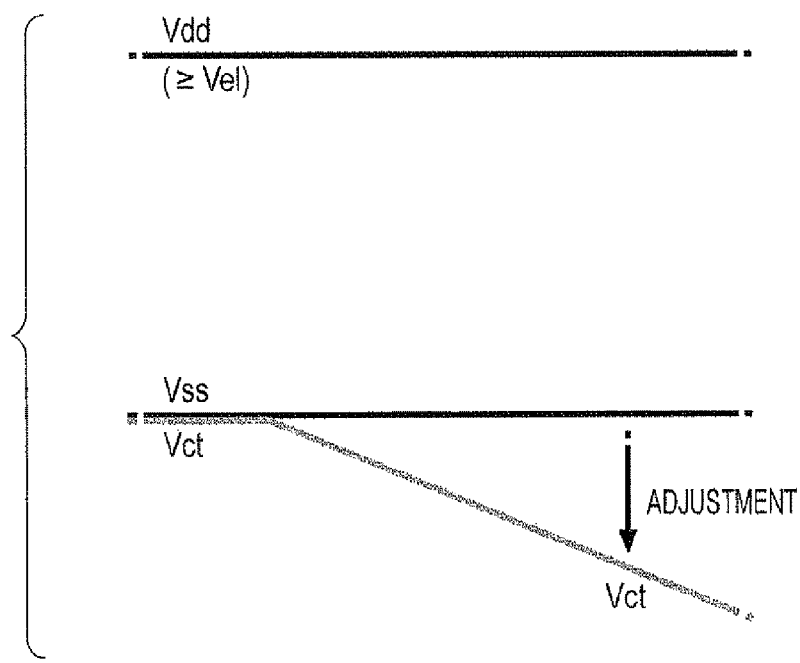
FIG. 7 is a diagram that illustrates an example of various voltage levels in the electro-optical device.

In order to supply, to the OLED 130, a sufficient amount of an electric current that is dependent on the voltage Vgs at the high-luminance side, the following level-adjustment solution was devised. For example, as illustrated in FIG. 7, the voltage Vct, which is applied to the cathode of the OLED 130, that is, the power-low-side voltage level Vct in the pixel circuit 110, is set independently of the logical-low-side voltage level Vss (low potential Vss of a logical signal) to be lower than this voltage level Vss.

Figure 8:
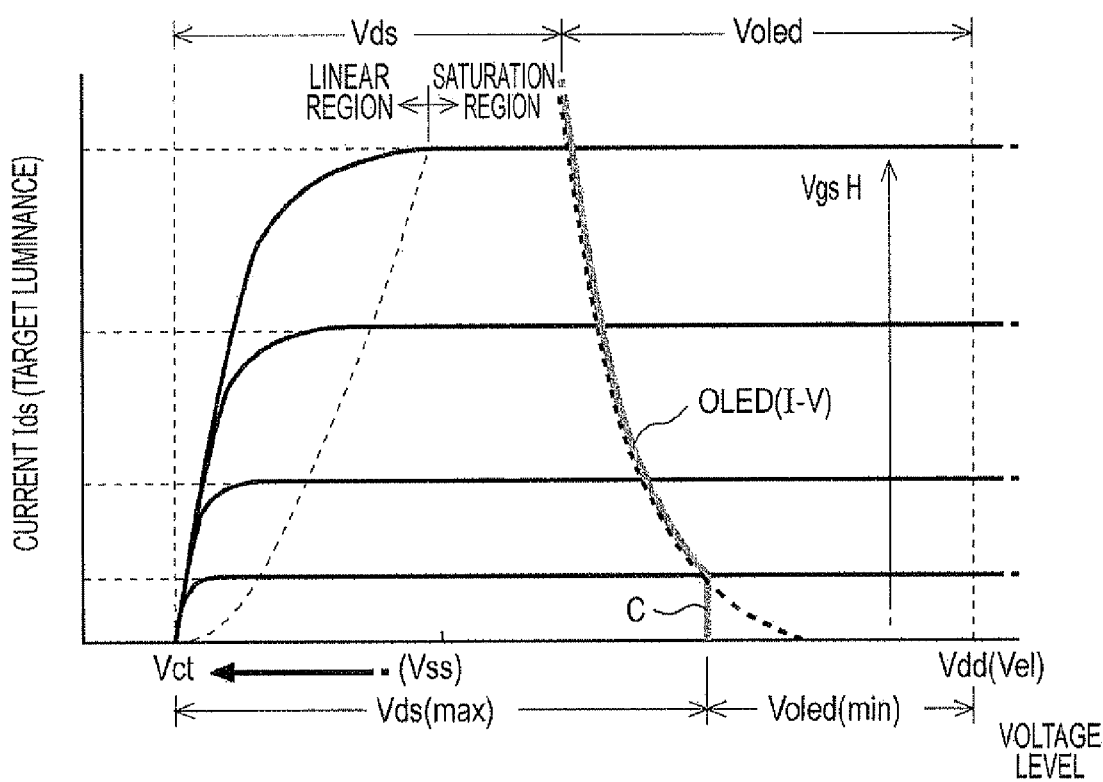
FIG. 8 is a diagram that illustrates an example of the operating point of a driving transistor and an MED.

FIG. 8 is a diagram that illustrates volt-ampere characteristics in a configuration in which the voltage level Vct is set to be lower than the voltage level Vss. A solid line indicates the characteristics of the transistor 124. A broken line indicates the characteristics of the OLED 130 according to the comparative example.

As illustrated in this drawing, the volt-ampere characteristics of the OLED 130 shifts into the saturation region of the transistor 124. Therefore, it is possible to supply, to the OLED 130, a sufficient amount of an electric current that is determined by the voltage Vgs at the high-luminance side.

However, when a small amount of an electric current is supplied to the OLED 130 at the low-luminance side, the voltage Voled between the anode of the OLED 130 and the cathode thereof is low due to the small amount of the current flowing therethrough. Since the voltage Voled is comparatively low, a voltage Vds between the drain of the transistor 124 and the source thereof is comparatively high by the corresponding degree. In addition, in this configuration, the power-voltage range (Vdd−Vct) of the pixel circuit 110 is greater than that explained above, that is, (Vdd−Vss).

For this reason, there is a risk that the transistor 124 might be damaged because a voltage that is not lower than a withstand voltage is applied between its drain and source at the low-luminance side. Especially, as the size and pitch of the pixel circuits 110 decreases, so does the withstand voltage of transistors. Therefore, this could be a major cause that makes it difficult to reduce the size of the micro display 10 and achieve high definition.

In contrast, in the present embodiment of the invention, the bias voltage Va is supplied to the node A, which is the junction of the drain of the transistor 124 and the anode of the OLED 130, from the feeder line 117 via the transistor 126, which is a diode-connected transistor. As described earlier, if the ground potential is taken as the basis of reference, the bias voltage Va is equal to the sum of the threshold voltage Vth_oled and the threshold voltage Vth_diode. The diode-connected transistor 126 offsets the threshold voltage Vth_diode.

For this reason, in the present embodiment of the invention, the voltage level at the node A never will be lower than a level obtained by the addition of the threshold voltage Vth_oled with the ground potential being taken as the basis of reference. Therefore, in the present embodiment of the invention, even though the voltage level Vct is set to be lower than the voltage level Vss, a voltage that is higher than a predetermined value, more specifically, the original power voltage (Vdd−Vss), will never be applied between the drain of the transistor 124 and the source thereof. This prevents the transistor 124 from being damaged due to the excess of the voltage applied between its drain and source over the withstand voltage.

Put another way, this can be further explained as follows. In the present embodiment of the invention, with the voltage level Vct being set to be lower than the voltage level Vss, when the voltage Voled between the anode of the OLED 130 and the cathode thereof is decreased for the purpose of light emission at the low-luminance side, the voltage level at the node A approaches a level obtained by the addition of the threshold voltage Vth_oled with the ground potential being taken as the basis of reference. In this process, an electric current starts to flow through the OLED 130 because of the bias voltage Va before the voltage level at the node A becomes actually lower than this level. Therefore, as indicated by a solid line C in FIG. 8, limiter effects are produced in such a way as to, when viewed from the OLED 130, ensure that the voltage Voled between its anode and cathode will never be lower than the minimum voltage Voled (min) and in such a way as to, when viewed from the transistor 124, ensure that the voltage Vds between its drain and source will never be higher than the maximum voltage Vds (max), wherein the maximum voltage Vds (max) is equal to the result of the subtraction of the minimum voltage Voled (min) from the power voltage (Vdd−Vct).

The fact that the voltage Voled between the anode of the OLED 130 and the cathode thereof will never be lower than the minimum voltage Voled (min) means that the value of an electric current that flows from the anode to the cathode will never be less than a predetermined value. This makes it impossible to perform grayscale representation at a certain level or lower at the low-luminance side. However, in a configuration in which half mirrors are used to superimpose a display image outputted from the micro displays 10 onto a transmission image of an outside scene, etc. as in the configuration of a head mount display that will be described later, deterioration in the quality of grayscale representation at the low-luminance side is quite tolerable. That is, in the extreme case, even when the display of the micro displays 10 is turned off, the user will not easily perceive deterioration in the quality of grayscale representation at the low-luminance side because of the existence of the transmission image in view.

APPLICATION/VARIATION EXAMPLES

The present invention is not limited to the exemplary embodiment described above. The invention can be applied and/or modified in various ways, for example, as disclosed as the following application/variation examples. The modes of application or modification described below may be implemented by combining any arbitrarily selected two or more of them; or, alternatively, any of them may be implemented in the form of a single independent mode.

First Application/Variation Example

Diode Connection

Figure 9:
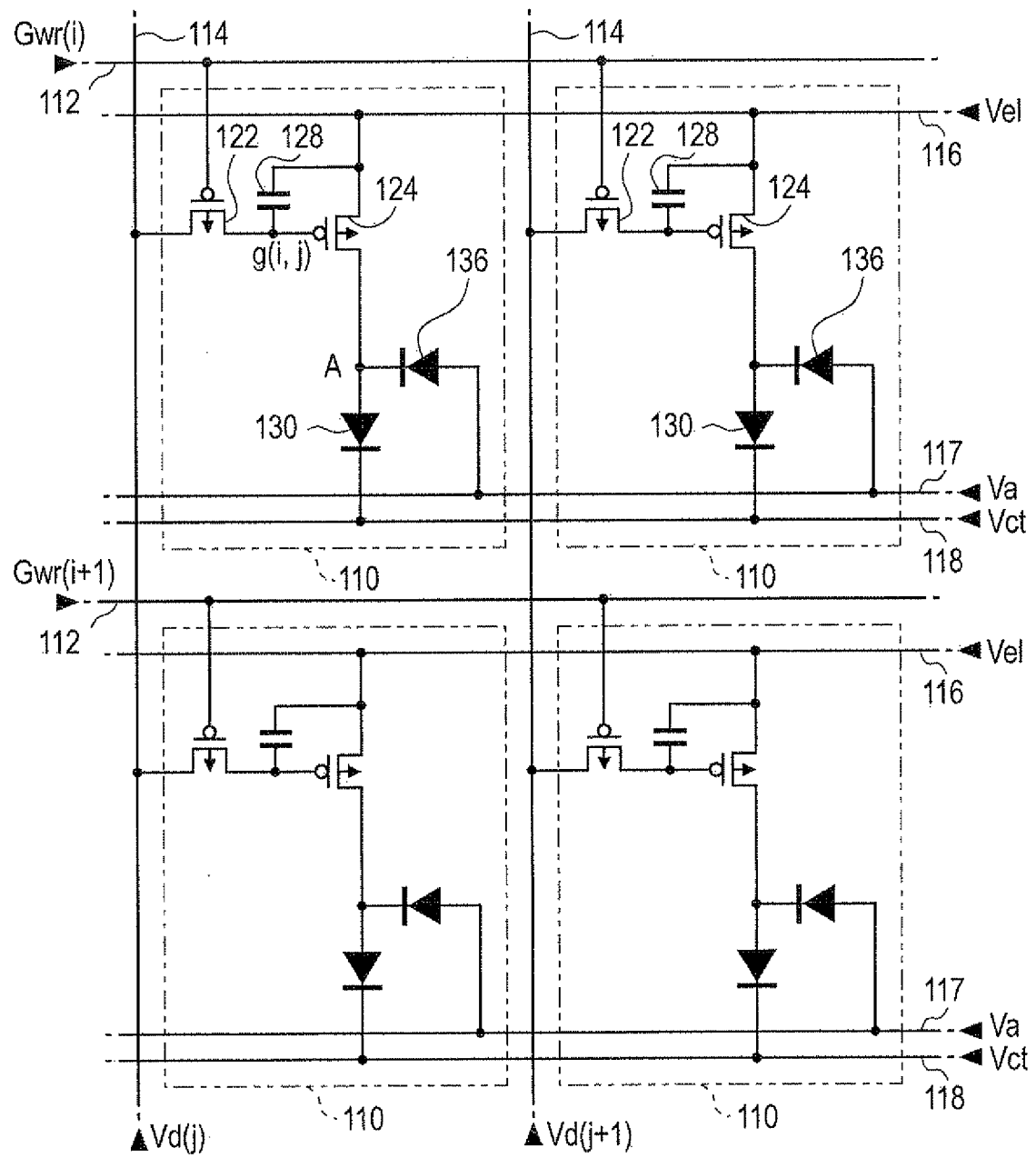
FIG. 9 is a diagram that illustrates pixel circuits in an electro-optical device according to an application/variation example (first).

In the foregoing embodiment of the invention, the transistor 126 is provided in each of the plurality of pixel circuits 110 between the node A and the feeder line 117. In addition, the transistor 126 is configured as a diode-connected transistor the forward direction of which is the direction toward the node A. However, the scope of the invention is not limited to such an exemplary configuration. For example, as illustrated in FIG. 9, the transistor 126 illustrated in FIG. 4 may be replaced with a diode element 136. The anode of the diode element 136 is connected to the feeder line 117. The cathode of the diode element 136 is connected to the node A. That is, in the description of this specification, the term "diode" is a concept that includes a diode element in addition to a diode-connected transistor.

Second Application/Variation Example

Transistor for Controlling Light Emission Time Period

Figure 10:
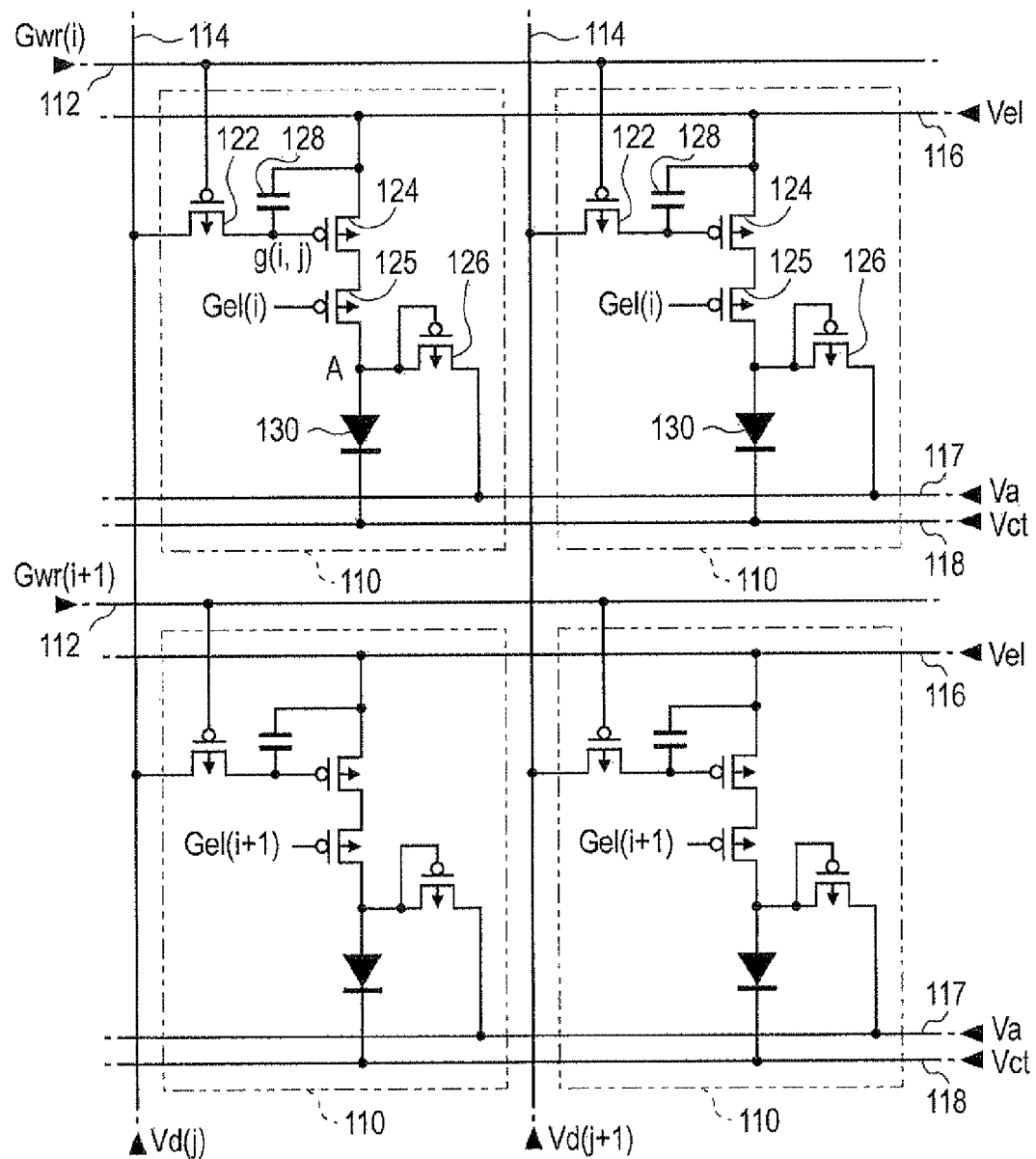
FIG. 10 is a diagram that illustrates pixel circuits in an electro-optical device according to an application/variation example (second).

In the foregoing embodiment of the invention, the anode of OLED 130 is connected directly to the drain node of the transistor 124. As illustrated in FIG. 10, the anode of OLED 130 may be connected indirectly to the drain node of the transistor 124 with a transistor 125 being connected therebetween. The transistor 125 controls the time period of light emission. More specifically, the source node of the transistor 125 is connected to the drain node of the transistor 124. The drain node of the transistor 125 is connected to the anode of the OLED 130, the drain node of the transistor 126, and the gate node of the transistor 126.

A control signal that is in synchronization with a scanning signal is supplied to the gate node of each of a row of the transistors 125 on a row-by-row basis. For example, a control signal Gel(i) is supplied to the gate node of each of the transistors 125 on the i-th row. A control signal Gel(i+1) is supplied to the gate node of each of the transistors 125 on the (i+1)-th row. By this means, it is possible to set the percentage of a time period during which the transistors 125 are on because the control signal is in the L level within a time period during which the scanning signal is in the H level in each row to be equal to the percentage of this time period in the other rows.

The circuit in a state in which the transistor 125 is on is equivalent to that illustrated in FIG. 4. Because of the equivalence in circuitry, this application/variation example is completely the same as the foregoing embodiment of the invention in that the transistor 124 and the OLED 130 are connected in series between the power high side and the power low side and in that the transistor 124 allows the electric current Ids, which is dependent on the voltage Vgs between its gate and source, to flow through the OLED 130.

With the circuit configuration of this application/variation example, besides the transistor 124, which allows the electric current to flow through the OLED 130, it is possible to prevent the transistor 125 from being damaged due to the excess of the voltage applied between its source and drain over the withstand voltage.

Third Application/Variation Example

Bias Generation Circuit

In the foregoing embodiment of the invention, the bias generation circuit 160 is configured as a peripheral circuit that is provided on the silicon substrate of the micro display 10. However, the scope of the invention is not limited to such an exemplary configuration.

Since the bias generation circuit 160 includes analog circuits such as the operational amplifiers 161, 162, 163, and 165, it is susceptible to the effects of noise from the scanning line driving circuit 140, etc., which operates as a logical circuit, if they are formed on the same single silicon substrate. On the other hand, since the OLED 130a is provided for the purpose of acquiring the threshold voltage Vth_oled, it is preferred that conditions for forming the OLED 130a be the same as conditions for forming the OLED 130 as much as possible. In like manner, since the diode 126a is provided for the purpose of acquiring the threshold voltage Vth_diode, it is preferred that conditions for forming the diode 126a be the same as conditions for forming the diode 126 as much as possible.

Figure 11:
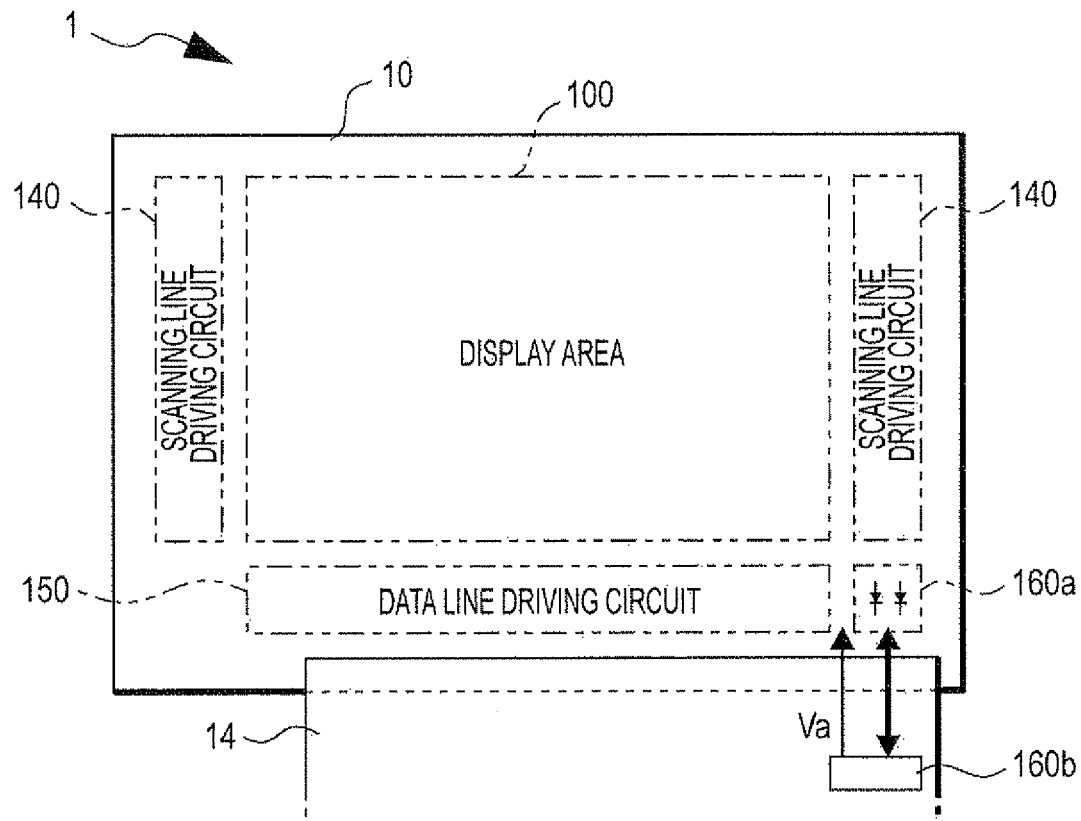
FIG. 11 is a diagram that illustrates pixel circuits in an electro-optical device according to an application/variation example (third).

In view of the above, the exemplary configuration may be modified as illustrated in FIG. 11. More specifically, in the configuration illustrated in FIG. 11, the OLED 130a and the diode 126a are provided in the area 160a of the micro display 10, whereas the other circuit elements are configured as, for example, the components of an IC circuit 160b that is mounted on the FPC wiring board 14. The IC circuit 160b supplies the bias voltage Va to the display unit 100 via the FPC wiring board 14.

Alternatively, the circuit elements other than the OLED 130a and the diode 126a may be included in the circuit module mentioned earlier instead of configuring them as the components of the IC circuit 160b.

Fourth Application/Variation Example

Bias Voltage

In the foregoing embodiment of the invention, the bias voltage Va, which is applied onto the feeder line 117, is equal to the sum of the threshold voltage Vth_oled and the threshold voltage Vth_diode if the ground potential is taken as the basis of reference. However, the scope of the invention is not limited to such an exemplary configuration. The bias voltage Va may be any voltage as long as it produces limiter effects in such a way as to ensure that, even though the voltage level Vct is set to be lower than the voltage level Vss, a voltage that is higher than the withstand voltage will never be applied between the drain of the transistor 124 and the source thereof.

Fifth Application/Variation Example

Others

In the foregoing embodiment of the invention, the transistors 122, 124, and 126 (125) of each of the plurality of pixel circuits 110 are configured as p-channel transistors. They may be configured as n-channel transistors. If requirements for a small size and a small pitch are not so strict, p-channel transistors and n-channel transistors may be mixed.

The light-emitting element, which is an OLED in the foregoing embodiment of the invention, may be an element other than an OLED. For example, an inorganic light-emitting diode or LED (Light Emitting Diode) may be used as the light-emitting element. Any element that emits light at a luminance level that is dependent on the amount of an electric current that flows between its two terminals and causes a change in a voltage between the drain of the transistor 124 and the source thereof in association with a change in a voltage between the terminals in accordance with the electric current may be used as the light-emitting element.

The power-high-side voltage level Vel of the pixel circuit 110 may be set to be lower than the logical-high-side voltage level Vdd as in the lower-side shift/adjustment example illustrated in FIG. 7.

Electronic Apparatus

A head mount display to which the micro display 10 according to the foregoing embodiment of the invention is applied will now be explained.

Figure 12:
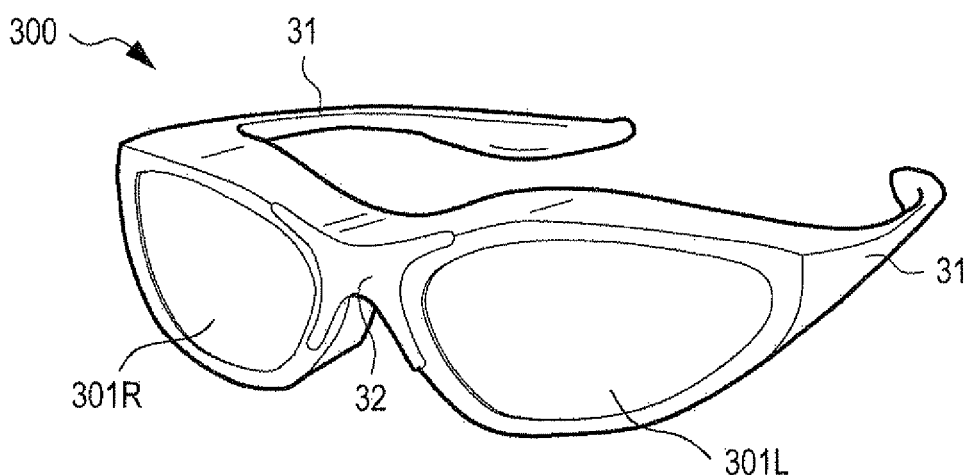
FIG. 12 is a perspective view that illustrates an HMD to which an electro-optical device according to an exemplary embodiment of the invention is applied.
Figure 13:
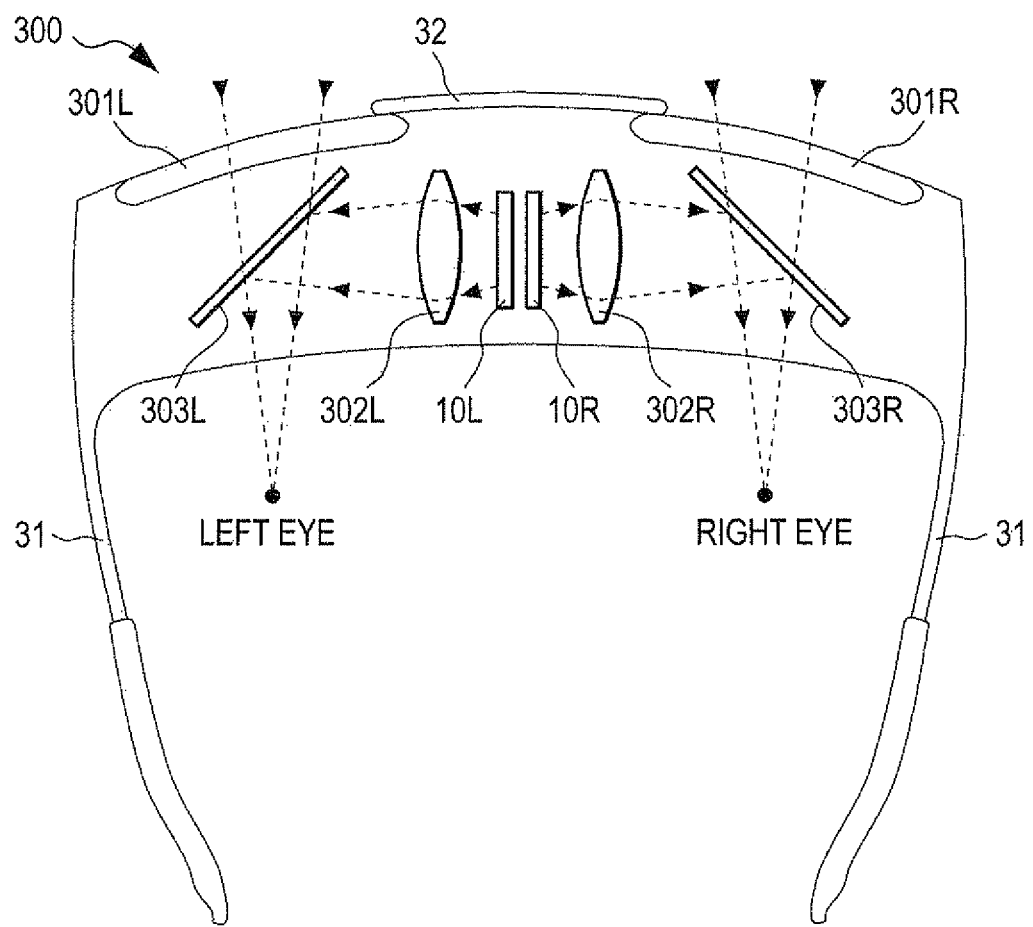
FIG. 13 is a diagram that illustrates an example of the optical configuration of the HMD.

FIG. 12 is a diagram that illustrates the appearance of a head mount display. FIG. 13 is a diagram that illustrates the optical configuration of the head mount display.

As illustrated in FIG. 12, the appearance of a head mount display 300 resembles that of a pair of glasses. The head mount display 300 includes skull temples 31, a bridge 32, a left lens 301L, and a right lens 301R. As illustrated in FIG. 13, the head mount display 300 further includes a micro display 10L for the left eye and a micro display 10R for the right eye. The micro displays 10L and 10R are provided near the bridge 32.

The image-display surface of the micro display 10L faces toward the left side in FIG. 13. Therefore, a display image outputted from the micro display 10L passes through an optical lens 302L to go in the 9 o'clock direction as illustrated in this drawing. A half mirror 303L reflects the display image coming from the micro display 10L. The reflected image goes in the 6 o'clock direction. The half mirror 303L allows 12 o'clock incident light to pass through itself.

The image-display surface of the micro display 10R faces toward the right side, which is the opposite of that of the left counterpart (10L). Therefore, a display image outputted from the micro display 10R passes through an optical lens 302R to go in the 3 o'clock direction as illustrated in this drawing. A half mirror 303R reflects the display image coming from the micro display 10R. The reflected image goes in the 6 o'clock direction. The half mirror 303R allows 12 o'clock incident light to pass through itself.

With the configuration described above, a user who wears the head mount display 300 can view the display images outputted from the micro displays 10L and 10R in a see-through state, that is, with these images being superposed on an outside scene.

If the head mount display 300 displays the left-eye part of parallactic binocular video on its micro display 10L and the right-eye part thereof on its micro display 10R, the wearer of the head mount display 300 will perceive the output video as if it were stereoscopic with the sense of depth (3D display).

Besides the head mount display 300, the micro display 10 can be used for a video camera, an electronic viewfinder in a lens-replaceable-type digital camera, and the like.

The entire disclosure of Japanese Patent Application No. 2011-163316, filed Jul. 26, 2011 is expressly incorporated by reference herein.

What is claimed is:

1. An electro-optical device, comprising:
a pixel circuit that includes
a driving transistor;
a light-emitting element;
a voltage limiter circuit, the voltage limiter circuit being a diode, a cathode of the diode being connected to a point of junction of the driving transistor and the light-emitting element and the other terminal of the diode being connected to a feeder line for a predetermined voltage level;
wherein
the driving transistor allows an electric current that is dependent on a voltage between a gate of the driving transistor and a source of the driving transistor to flow through the light-emitting element, the light-emitting element emits a light at a luminance that is dependent on the electric current, and
the voltage limiter circuit performs voltage limiting in such a way as to ensure that a voltage between the drain of the driving transistor and the source of the driving transistor does not exceed a predetermined value;
a first element located outside of a display area, wherein the first element acquires a threshold voltage of the light-emitting element; and
a second element located outside of the display area, wherein the second element acquires a threshold voltage of the diode,
wherein a bias voltage applied to the diode is determined from the threshold voltage of the light-emitting element and the threshold voltage of the diode acquired by the first and second elements located outside of the display area, and
wherein a potential that is equal to sum of a voltage that is based on a level of a voltage that is applied to one of two terminals of the light-emitting element, a threshold voltage of the light-emitting element, and a threshold voltage of the diode is applied to the feeder line, and the one of two terminals is a point that is not connected to the driving transistor.

2. The electro-optical device according to claim 1, wherein the diode is a diode-connected transistor or a diode element.

3. An electronic apparatus that is provided with the electro-optical device according to claim 2.

4. The electro-optical device according to claim 1, wherein the pixel circuit is provided at a position corresponding to each of intersections of a plurality of scanning lines and a plurality of data lines; the plurality of scanning lines, the plurality of data lines, and the plurality of pixel circuits are formed on the same single substrate; and a potential of the data line is retained at the gate of the driving transistor when the scanning line is selected.

5. The electro-optical device according to claim 4, wherein the first element and the second element are formed on the substrate.

6. An electronic apparatus that is provided with the electro-optical device according to claim 5.

7. An electronic apparatus that is provided with the electro-optical device according to claim 4.

8. The electro-optical device according to claim 1, wherein the light-emitting element includes a pixel electrode and a common electrode; the pixel electrode is connected via the driving transistor to a power line to which a fixed potential is applied; and a potential of the common electrode is set variably.

9. An electronic apparatus that is provided with the electro-optical device according to claim 8.

10. An electronic apparatus that is provided with the electro-optical device according to claim 1.

11. A power supply method that is to be used by an electro-optical device, the electro-optical device including a pixel circuit, the pixel circuit including a driving transistor, a light-emitting element, and a voltage limiter circuit, the voltage limiter circuit being a diode, a cathode of the diode being connected to a point of junction of the driving transistor and the light-emitting element and the other terminal of the diode being connected to a feeder line for a predetermined voltage level, the driving transistor and the light-emitting element being connected to power supply in series, the electro-optical device further including a first element located outside of a display area, wherein the first element acquires a threshold voltage of the light-emitting element, and a second element located outside of the display area, wherein the second element acquires a threshold voltage of the diode, an electric current that is dependent on a voltage between a gate of the driving transistor and a source of the driving transistor flowing through the light-emitting element, the light-emitting element emitting a light at a luminance that is dependent on the electric current, and voltage limiting is performed in such a way as to ensure that a voltage between the drain of the driving transistor and the source of the driving transistor does not exceed a predetermined value even when a voltage of the power supply is set to be high, wherein a bias voltage applied to the diode is determined from the threshold voltage of the light-emitting element and the threshold voltage of the diode acquired by the first and second elements located outside of the display area, and wherein a potential that is equal to sum of a voltage that is based on a level of a voltage that is applied to one of two terminals of the light-emitting element, a threshold voltage of the light-emitting element, and a threshold voltage of the diode is applied to the feeder line, and the one of two terminals is a point that is not connected to the driving transistor.

* * * * *